United States Patent
John Wilson et al.

(10) Patent No.: US 11,445,499 B2
(45) Date of Patent: Sep. 13, 2022

(54) MCS/RANK ADJUSTMENT WHEN MULTIPLEXING DATA IN A CONTROL REGION

(71) Applicant: QUALCOMM Incorporated, San Diego, CA (US)

(72) Inventors: Makesh Pravin John Wilson, San Diego, CA (US); Tao Luo, San Diego, CA (US); Sony Akkarakaran, Poway, CA (US); Sumeeth Nagaraja, Los Altos, CA (US); Shengbo Chen, San Diego, CA (US); Xiao Feng Wang, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 16/712,794

(22) Filed: Dec. 12, 2019

(65) Prior Publication Data
US 2020/0154431 A1   May 14, 2020

Related U.S. Application Data

(63) Continuation of application No. 15/895,789, filed on Feb. 13, 2018, now Pat. No. 10,512,080.
(Continued)

(51) Int. Cl.
*H04W 72/04* (2009.01)
*H04W 72/06* (2009.01)
(Continued)

(52) U.S. Cl.
CPC ........ *H04W 72/0446* (2013.01); *H04B 7/063* (2013.01); *H04L 1/0026* (2013.01);
(Continued)

(58) Field of Classification Search
CPC ........... H04W 72/0446; H04W 72/042; H04W 72/06; H04W 52/16; H04W 52/262;
(Continued)

(56) References Cited

U.S. PATENT DOCUMENTS

| 8,665,811 B2 | 3/2014 | Nory et al. |
| 9,397,796 B2 | 7/2016 | Papasakellariou |

(Continued)

FOREIGN PATENT DOCUMENTS

| CN | 102742191 A | 10/2012 |
| CN | 103491042 A | 1/2014 |

(Continued)

OTHER PUBLICATIONS

Ericsson, "On Data Transmission on Control Resource Set", 3gpp Draft, R1-1703289, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 13, 2017-Feb. 17, 2017, Feb. 12, 2017 (Feb. 12, 2017), XP051210419, Retrieved from the Internet:URL:http://www.3gpp.org/ftp/Meetings_3GPP SYNC/RAN1/Docs/,[retrieved on Feb. 12, 2017].

(Continued)

*Primary Examiner* — Kiet Tang
(74) *Attorney, Agent, or Firm* — Danai Nelisile Mhembere; Procopio, Cory, Hargreaves & Savitch LLP

(57) ABSTRACT

A base station may make more efficient use of resources by transmitting data in a control region of a slot in addition to a data region. In order to avoid performance loss, the base station may adjust the data transmission in the control region in comparison to a data transmission in a data region and may signal an indication to a UE to assist the UE in receiving the data transmission in the control region. An apparatus for wireless communication at the UE receives the indication (Continued)

from the base station regarding the data transmission in the control region and uses the indication to perform rate matching or demodulation of the data transmission in the control region. The indication may indicate any of a different MCS/rank/TPR, a reduced MCS/rank/TPR, an MCS/rank/TPR delta, a control span for a group of UEs, and a starting symbol for the data transmission. The indication may also indicate that there is no data transmitted on resources in the control region.

34 Claims, 13 Drawing Sheets

Related U.S. Application Data

(60) Provisional application No. 62/473,267, filed on Mar. 17, 2017.

(51) Int. Cl.
| | | |
|---|---|---|
| *H04L 1/00* | (2006.01) | |
| *H04L 5/00* | (2006.01) | |
| *H04B 7/06* | (2006.01) | |
| *H04L 1/18* | (2006.01) | |
| *H04L 25/02* | (2006.01) | |
| *H04B 7/08* | (2006.01) | |
| *H04B 7/0456* | (2017.01) | |
| *H04W 52/16* | (2009.01) | |
| *H04W 52/26* | (2009.01) | |

(52) U.S. Cl.
CPC .......... *H04L 1/0029* (2013.01); *H04L 1/0031* (2013.01); *H04L 5/0023* (2013.01); *H04L 5/0044* (2013.01); *H04L 5/0053* (2013.01); *H04L 5/0091* (2013.01); *H04W 72/042* (2013.01); *H04W 72/06* (2013.01); *H04B 7/0486* (2013.01); *H04B 7/0695* (2013.01); *H04B 7/088* (2013.01); *H04L 1/0003* (2013.01); *H04L 1/007* (2013.01); *H04L 1/0009* (2013.01); *H04L 1/1861* (2013.01); *H04L 5/0055* (2013.01); *H04L 25/0228* (2013.01); *H04L 2001/0098* (2013.01); *H04W 52/16* (2013.01); *H04W 52/262* (2013.01)

(58) Field of Classification Search
CPC .. H04W 72/044; H04L 5/0044; H04L 1/0031; H04L 1/0029; H04L 5/0053; H04L 5/0091; H04L 5/0023; H04L 1/0026; H04L 1/007; H04L 1/0003; H04L 1/0009; H04L 2001/0098; H04L 5/0055; H04L 1/1861; H04L 25/0228; H04L 5/0005; H04L 5/0094; H04L 1/0067; H04L 1/0023; H04L 5/0014; H04B 7/063; H04B 7/088; H04B 7/0486; H04B 7/0695; H04B 7/0621
See application file for complete search history.

(56) References Cited

U.S. PATENT DOCUMENTS

| | | | |
|---|---|---|---|
| 9,402,252 B2 | 7/2016 | Kim et al. | |
| 2010/0027409 A1 | 2/2010 | Kwon et al. | |
| 2011/0051835 A1* | 3/2011 | Yuan ................... | H04B 7/0417 375/267 |
| 2013/0279356 A1* | 10/2013 | Park ..................... | H04B 7/0695 370/252 |
| 2014/0003369 A1 | 1/2014 | Josiam et al. | |
| 2014/0348090 A1 | 11/2014 | Nguyen et al. | |
| 2015/0009952 A1 | 1/2015 | Berggren et al. | |
| 2015/0009968 A1* | 1/2015 | Yu ....................... | H04B 7/0408 370/336 |
| 2015/0085765 A1 | 3/2015 | Tavildar et al. | |
| 2017/0013599 A1 | 1/2017 | Sun et al. | |
| 2017/0265060 A1 | 9/2017 | Bin et al. | |
| 2018/0270814 A1 | 9/2018 | John et al. | |
| 2018/0309496 A1* | 10/2018 | Lee ...................... | H04L 5/0023 |
| 2020/0029312 A1* | 1/2020 | Falahati ............ | H04W 72/0446 |

FOREIGN PATENT DOCUMENTS

| | | |
|---|---|---|
| CN | 103931133 A | 7/2014 |
| CN | 105850057 A | 8/2016 |
| CN | 105934917 A | 9/2016 |

OTHER PUBLICATIONS

Ericsson, "Summary of E-Mail Discussions on Downlink Control Signaling", 3GPP Draft, R1-1701036, Summary Of E-Mail Disc On Dl Ctrl Sig, 3rd Generation Partnership Project (3GPP), Mobile Competence Centre, 650, Route Des Lucioles, F-06921 Sophia-Antipolis Cedex, France vol. RAN WG1, No. Spokane, WA, USA, Jan. 16, 2017-Jan. 20, 2017, Jan. 16, 2017 (Jan. 16, 2017), XP051208551, Retrieved from the Internet: URL:http://www.3gpp.org/ftp/Meetings_3GPP_SYNC/RAN1 /Docs/ [retrieved on Jan. 16, 2017].
HTC, "sPDCCH Design for Short TTI", 3GPP Draft, R1-1702373 sPDCCH Design For Short TTI, 3RD Generation Partnership Project (3GPP), Mobile Competence Centre, 650, Route Des Lucioles, F-06921 Sophia-Antipolis Cedex, France vol. RAN WG1, No. Athens, Greece, Feb. 13, 2017-Feb. 17, 2017, Feb. 12, 2017 (Feb. 12, 2017), XP051209527, Retrieved from the Internet:URL:http://www.3gpp.org/ftp/Meetings_3GPP SYNC/RAN1/Docs/ [retrieved on Feb. 12, 2017].
International Search Report and Written Opinion—PCT/US2018/018229—ISA/EPO—dated May 17, 2018.
Qualcomm Incorporated, "R-PDCCH Design", 3GPP Draft; R1-102344 R-PDCCH Design, 3rd Generation Partnership Project (3GPP), Mobile Competence Centre 650, Route Des Lucioles, F-06921 Sophia-Antipolis Cedex, France, vol. RAN WG1, No. Beijing, china, Apr. 12, 2010, Apr. 6, 2010 (Apr. 6, 2010),XP050419573, [retrieved on Apr. 6, 2010].
Bin Z., "Research on Key Technology of TD-LTE Wireless Network Planning," China Excellent Master Degree Thesis Full-text Database Information Technology Series, Mar. 27, 2012, 83 pages, the whole document.
LG Electronics: "Discussion on Resource Unit for Control Channel," R1-1611835, 3GPP TSG RAN WG1 Meeting #87, Reno, USA, Nov. 14-18, 2016, pp. 1-4.

* cited by examiner

MCS/RANK ADJUSTMENT WHEN MULTIPLEXING DATA IN A CONTROL REGION

CROSS-REFERENCE TO RELATED APPLICATION

This application is a Continuation of U.S. patent application Ser. No. 15/895,789 entitled "MC S/RANK ADJUSTMENT WHEN MULTIPLEXING DATA IN A CONTROL REGION" and filed on Feb. 13, 2018, which claims the benefit of U.S. Provisional Application Ser. No. 62/473,267, entitled "MCS/RANK ADJUSTMENT WHEN MULTIPLEXING DATA IN A CONTROL REGION" and filed on Mar. 17, 2017, which are expressly incorporated by reference herein in their entirety.

BACKGROUND

Field

The present disclosure relates generally to communication systems, and more particularly, to the transmission and reception of data in a control region.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A control region in 5G/NR, e.g., spanning first few Orthogonal frequency-division multiplexing (OFDM) symbols, may be split into sub-bands called resource sets. For example, the control region may span a designated set of symbols within a slot. When only a subset of the resource sets in the control region are utilized for control channel transmissions, e.g., Physical Downlink Control Channel (PDCCH) transmission, of the remaining resource sets are unused. These unused resource sets in the control region could be used for data transmissions, e.g., Physical Downlink Shared Channel (PDSCH). Similarly, resources of an uplink control region that are not used for control transmissions may be used for data transmissions, e.g., Physical Uplink Shared Channel (PUSCH) transmissions. However, performance may be impacted when data, such as PDSCH or PUSCH, is transmitted in the control region. For example, using a same modulation and coding scheme (MCS) for data transmitted in the control as for data transmitted in a data region may impact performance. Additionally, due to analog beamforming (BF) constraints, a user equipment (UE) might be forced to use a control beam to receive the data, which may lead to performance loss. Furthermore, an interference profile in the control region, e.g., the first few OFDM symbols, may be different from an interference profile in a data region. Therefore, there is a need to improve data transmission, e.g., PDSCH/PUSCH performance, when data is transmitted in resources of a control region.

In order to avoid performance loss, a base station may adjust the data transmission in the control region in comparison to a data transmission in a data region. For example, the base station may transmit PDSCH in a control region using a different MCS, a different rank, or a different Traffic-to-pilot Ratio (TPR) than the base station uses to transmit PDSCH in a data region. A different MCS may include a different modulation, e.g., 16 QAM for a data transmission in a control region rather than the 64 QZM used for a data transmission in a data region. A different MCS may also include a different coding rate, e.g., a coding rate of ½ code for a data transmission in a control region rather than the ⅔ coding rate used for a data transmission in a data region. The base station may provide information to the UE regarding such data transmissions in the control region. The UE may use the information to perform rate matching or demodulation of the data transmission. Similarly, the base station may provide information to the UE that the UE may use to adjust MCS/rank/TPR for transmitting a PUSCH in a control region.

In an aspect of the disclosure, a method, a computer-readable medium, and an apparatus are provided for wireless communication at a UE. The apparatus receives communication from a base station in a control region and a data region of a slot. The UE receives an indication from the base station regarding a data transmission in the control region. The data transmission in the control region overlaps a control transmission in time, and the indication indicates a different MCS, a different rank, and/or a different TPR for the data transmission in the control region than for data transmitted in a data region. The indication may comprise any of a reduced MCS, a reduced rank, an MCS delta, a different TPR, a TPR delta, a rank delta, an indication that no data is transmitted in the control region, a control span for a group of UEs, and a starting symbol for the data transmission. The apparatus may use the indication to perform rate matching or demodulation of the data transmission.

The indication may be received as any of Radio Resource Control (RRC) signaling, a Medium Access Control (MAC) control element, or downlink control information (DCI).

In another aspect of the disclosure, a method, a computer-readable medium, and an apparatus are provided for wireless communication at a base station. The apparatus transmits communication to a UE a control region and a data region and transmits an indication to the UE regarding a data transmission in the control region. The data transmission in the control region may overlap a control transmission in time, and the indication may indicate a different MCS, a different rank, and/or a different TPR for the data transmission in the control region than the MCS/rank for data transmitted in a data region. The indication may comprise any of a reduced MCS, a reduced rank, an MCS delta, a different TPR, a TPR delta, a rank delta, an indication that no data is transmitted in the control region, a control span for a group of UEs, and a starting symbol for the data transmission. The apparatus may use the indication to perform rate matching or demodulation of the data transmission. The indication may be received as any of RRC signaling, a MAC control element, or DCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
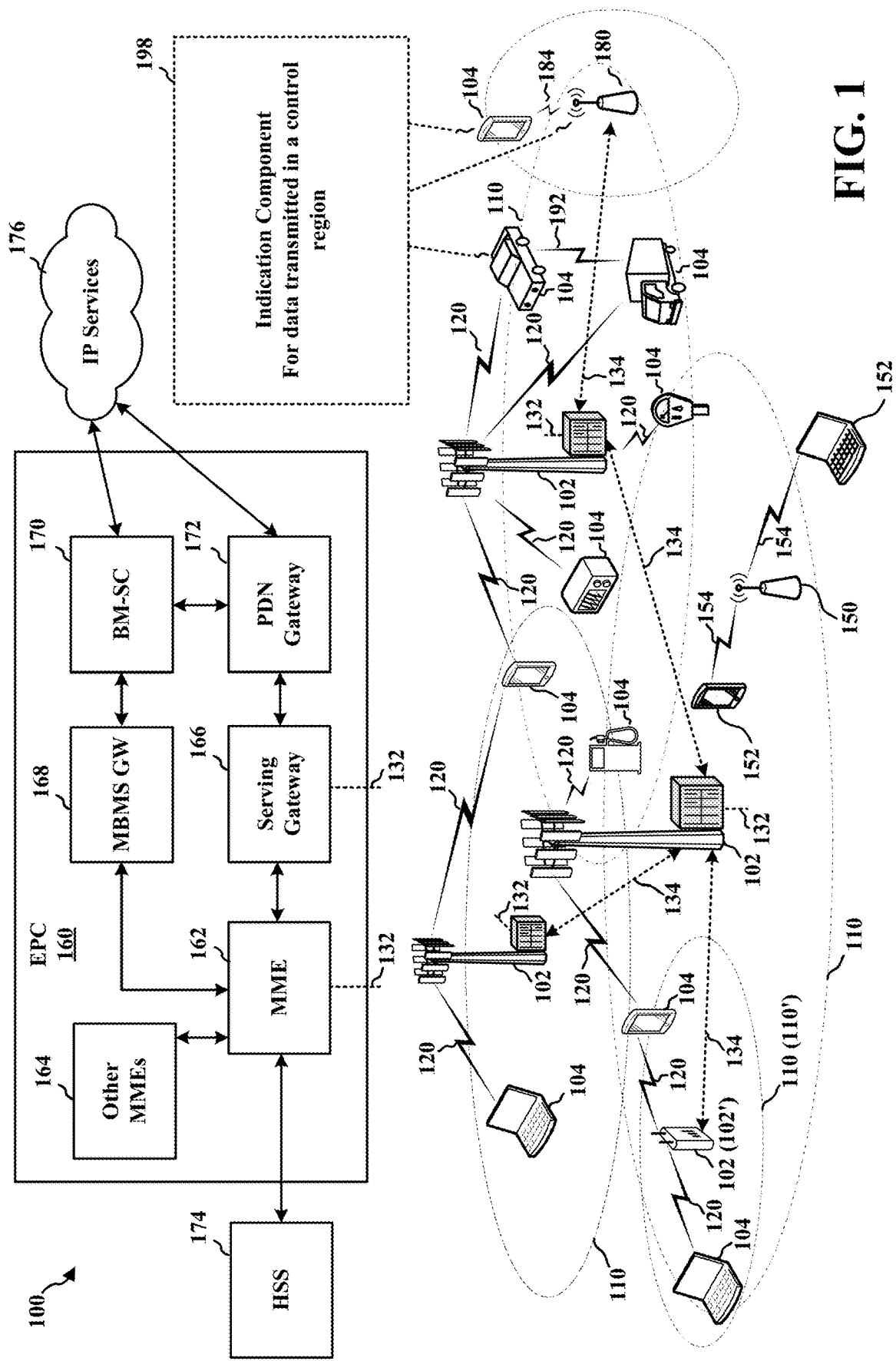
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ 5G/NR and use the same 5 GHz unlicensed frequency spectrum as used by the Wi-Fi AP 150. The small cell 102', employing 5G/NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive data transmissions in a control region of a slot. The UE 104 may comprise an indication component 198 configured to receive an indication from a base station regarding the data transmission in the control region. Similarly, the base station 102 may comprise a corresponding indication component configured to provide the indication to the UE. The indication may provide the UE with information regarding a different MC S/rank used for the data transmission compared to a data transmission in a data region of the slot, among other information.

Figure 2:
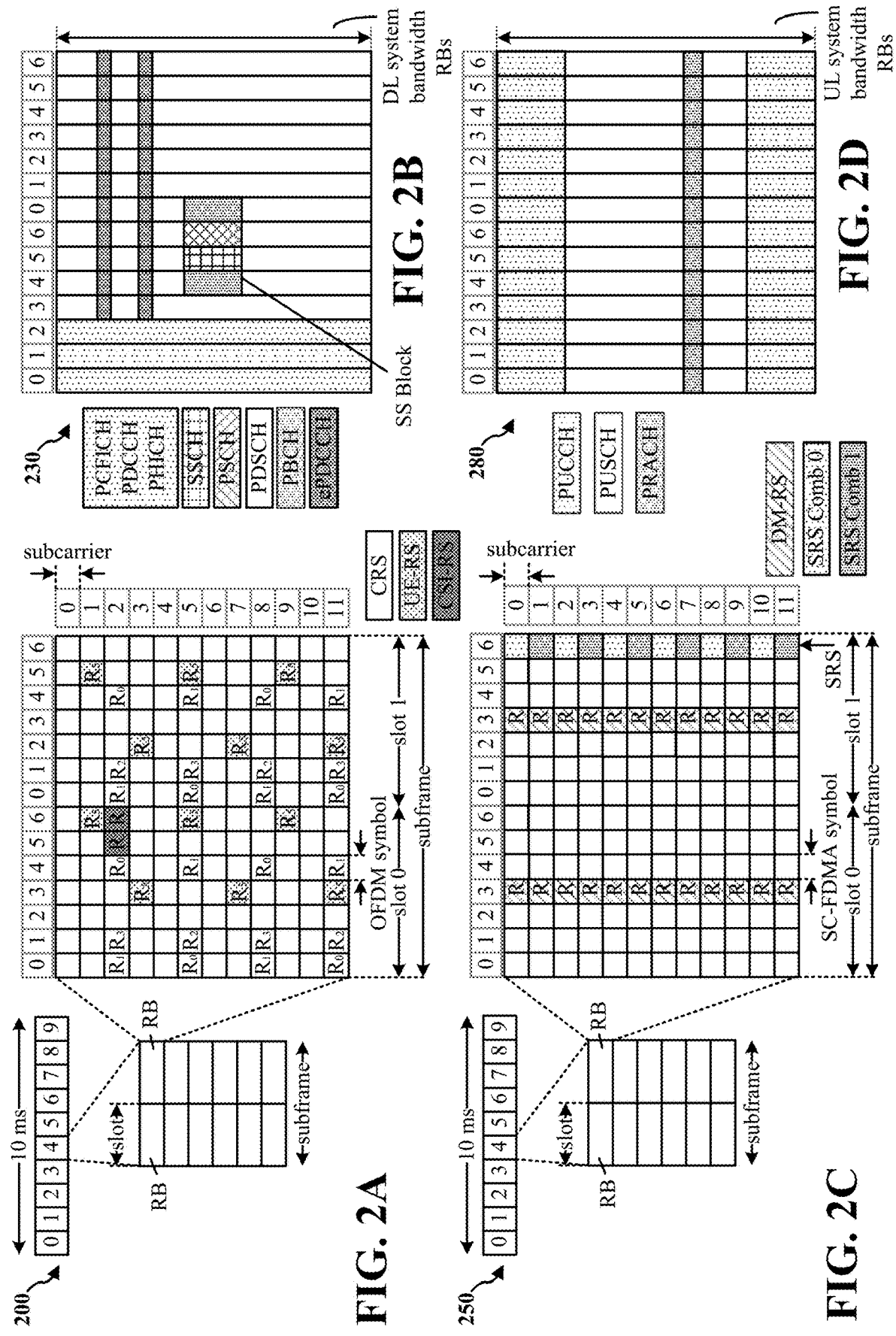
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. For example, aspects of the frame structure may be employed for a 5G/NR frame structure. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 a DL subframe and subframe 7 an UL subframe. While subframe 4 is illustrated as providing just DL and subframe 7 is illustrated as providing just UL, any particular subframe may be split into different subsets that provide both UL and DL. Note that the description infra applies also to a 5G/NR frame structure that is FDD.

A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
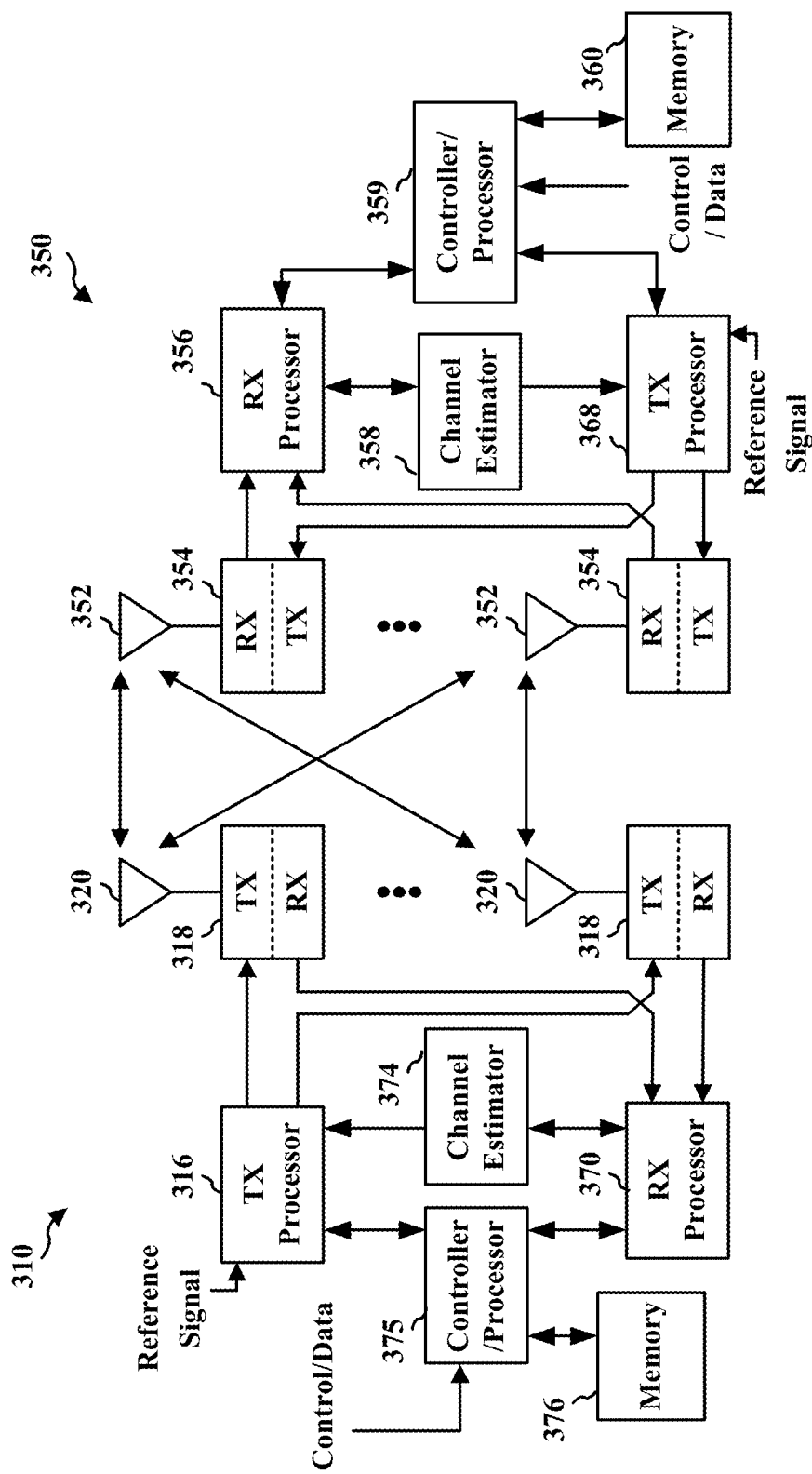
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
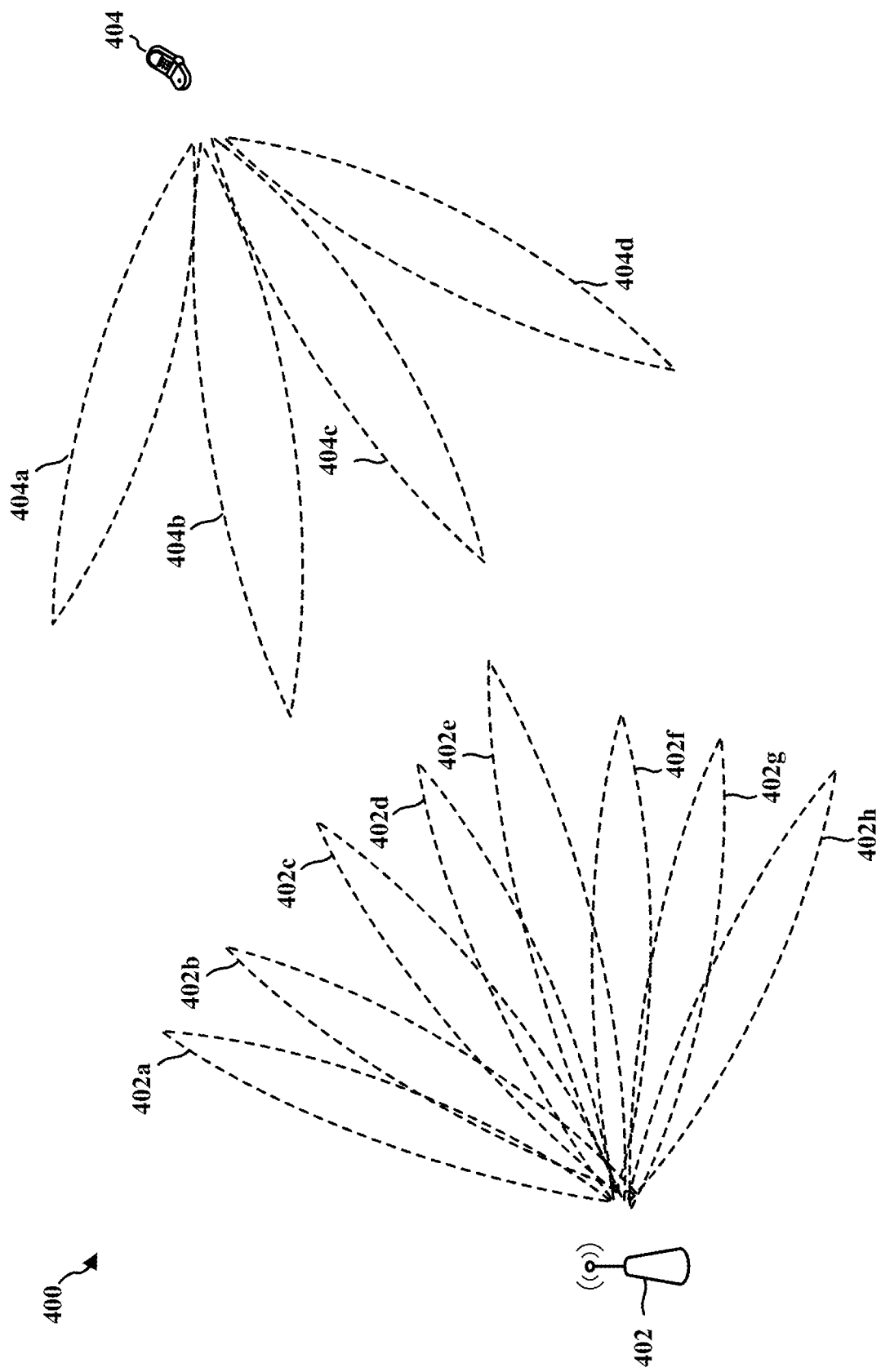
FIG. 4 is a diagram illustrating a base station in communication with a UE.

FIG. 4 is a diagram 400 illustrating a base station 402 in communication with a UE 404. Referring to FIG. 4, when the UE 404 turns on, the UE 404 searches for a nearby NR network. The UE 404 discovers the base station 402, which belongs to an NR network. The base station 402 may transmit an SS block including the PSS, SSS, and the PBCH (including the MIB) periodically in different transmit directions 402a-402h. The UE 404 receives the transmission 402e including the PSS, SSS, and PBCH. Based on the received SS block, the UE 404 synchronizes to the NR network and camps on a cell associated with the base station 402. the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5:
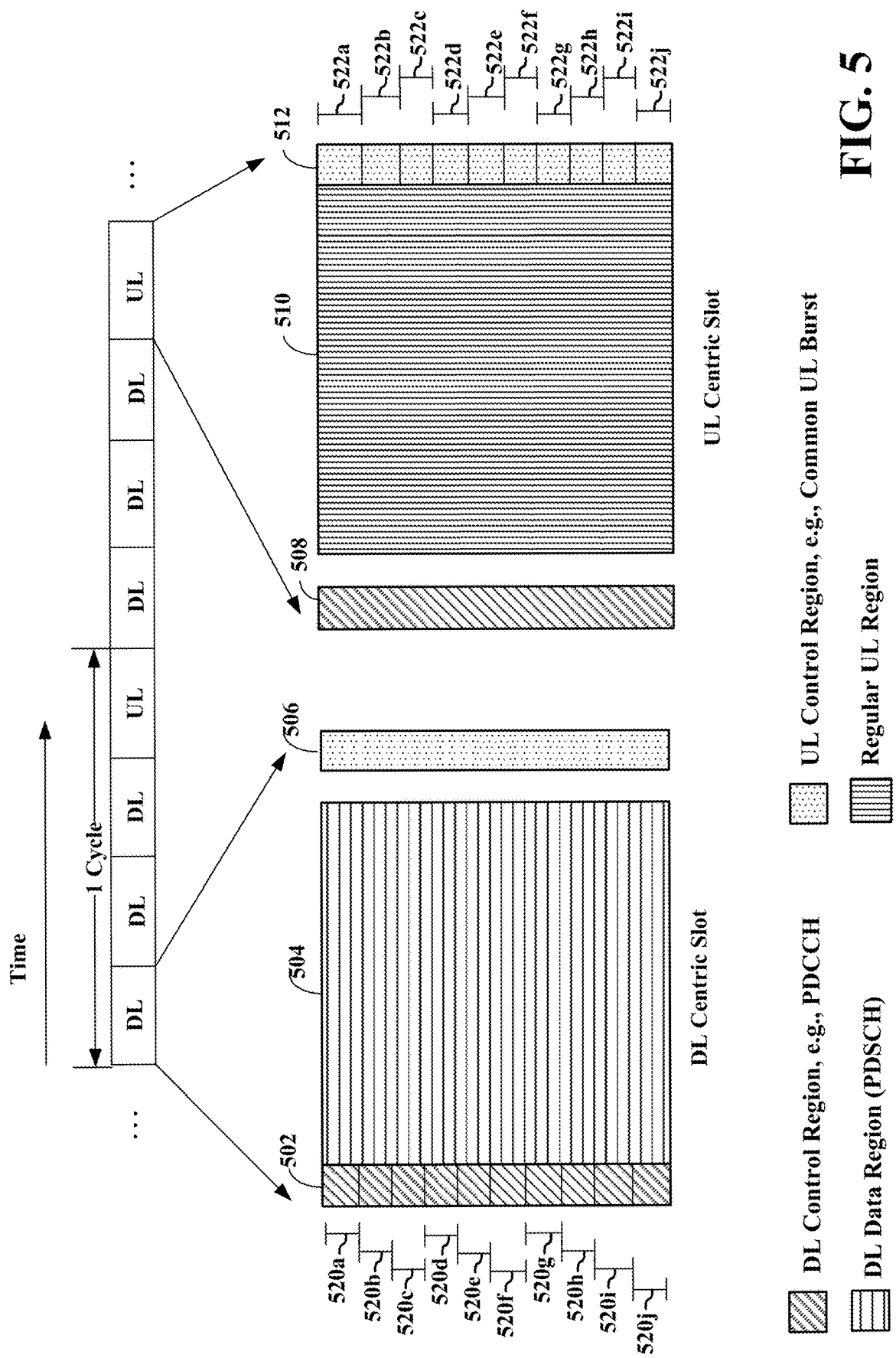
FIG. 5 is a diagram illustrating an example slot structure comprising DL centric slots and UL centric slots.

FIG. 5 illustrates an example slot structure comprising DL centric slots and UL centric slots, which may be employed in 5G/NR wireless communication. In 5G/NR, a slot may have, e.g., a duration of 0.5 ms, 0.25 ms, etc., and each slot may have 7 or 14 symbols. A resource grid may be used to represent the time slots, each time slot including one or more time concurrent resource blocks (RBs) (also referred to as physical RBs (PRBs)). The resource blocks for the resource grid may be further divided into multiple resource elements (REs). The number of bits carried by each RE depends on the modulation scheme.

A slot may be DL only or UL only, and may also be DL centric or UL centric. FIG. 5 illustrates an example DL centric slot. The DL centric slot may comprise a DL control region 502, e.g., in which in which physical downlink control channel (PDCCH) is transmitted. Some of the REs of the DL centric slot may carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS).

A DL control region 502, 508 may span one or a few OFDM symbols, e.g., at the beginning of the slot. The DL control region 502, 508 may comprise multiple subbands, e.g., 520a-j illustrated for DL control region 502. The subbands may also be referred to as a resource set. Thus, each subband 520a-j may comprise a resource set that spans only a portion of the bandwidth of the control region 502 rather than the entire bandwidth of the control region. FIG. 5 illustrates the control region 502 having 10 subbands, e.g., 10 resource sets. This is only an example, and any number of subbands/resource sets may be comprised in the control region. Additionally, FIG. 5 illustrates the subbands/resource sets 520a-j having a similar size. However, in other examples, the sizes, in frequency, of the subbands/resource sets 520a-j may be different for different subbands/resource sets. DL control region 508 may similarly comprise multiple subbands/resource sets. The subbands/resource sets for DL control region 502 of a DL centric slot may be the same as for DL control region 508 of an UL centric slot. In another example, the subbands/resource sets may be different between the DL centric slot and the UL centric slot.

The separation of the control region 502, 508 into subbands/resource sets enables a UE to monitor only a few resource sets/subbands rather than monitoring the entire bandwidth of the control region 502, 508. This provides power savings at the UE by allowing the UE to receive control information while monitoring a reduced bandwidth.

A base station may use the resource sets of the control region 502, 508 to transmit common control transmissions from the base station. For example, the base station may broadcast a physical broadcast channel (PBCH) that is cell specific and applies to multiple UEs. The PBCH may carry a master information block (MIB). The MIB may carry information such as the number of RBs in the DL system bandwidth and a system frame number (SFN). A base station may also use the resource sets of the control region 502, 508 to transmit UE specific control signaling, e.g., via RRC, etc. The signaling may be specific to a single UE. Other UEs might not be aware of the resources used to transmit UE specific control signaling. Thus, the resource sets may comprise at least one common resource set, e.g., subband, used for common control transmissions and possibly one or more UE specific resource set, e.g., subband, used for UE specific control transmissions.

At times, only a portion of the subbands/resource sets 520a-j might be used for control transmissions. Aspects presented herein improve the efficient utilization of resources by enabling data transmission in unused resources of the DL control region 502, 508.

The DL centric slot may comprise a DL data region 504, e.g., in which a physical downlink shared channel (PDSCH) carries user data, broadcast system information not transmitted through the PBCH such as system information blocks (SIBs), and paging messages.

The DL centric slot may also comprise a common UL burst region (ULCB) 506 in which UEs may send UL control channel information or other time sensitive or otherwise critical UL transmissions. This ULCB region may also be referred to as an UL control region 506.

The UL control region 506 of the DL centric slot, and similarly, the UL control region 512 of the UL centric slot may be subdivided into subbands/resource sets 522a-522j. FIG. 5 illustrates the UL control region 506, 512 having 10 subbands/resource sets. This is only an example, and any number of subbands/resource sets may be comprised in the control region. Additionally, FIG. 5 illustrates the subbands/resource sets 522a-j having a similar size. However, in other examples, different subbands/resource sets 522a-j may have different bandwidths. The subbands/resource sets for UL control region 506 of a DL centric slot may be the same as for UL control region 512 of an UL centric slot. In another example, the subbands may be different between the UL centric slot and the DL centric slot. Additionally, in FIG. 5, the subbands/resource sets for the DL control regions 502, 508 and the UL control regions 506, 512, are illustrated as having the same subbands. In other examples, different subbands/resource sets may be provided for DL control regions 502, 508 than are provided for the UL control regions 506, 512.

A UE may transmit physical uplink control channel (PUCCH), sounding reference signals (SRS), physical random access channel (PRACH), etc. in the UL control regions 506, 512. The SRS may be used by a base station for channel quality estimation to enable frequency-dependent scheduling on the UL. The PRACH may be included within one or more slots within a slot structure based on the PRACH configuration. The PRACH allows the UE to perform initial system access and achieve UL synchronization. The UL control region 506, 512 may comprise a PUCCH that carries uplink control information (UCI), such as scheduling requests, a channel quality indicator (CQI), a precoding matrix indicator (PMI), a rank indicator (RI), and HARQ ACK/NACK feedback.

At times, only a portion of the subbands 522a-j might be used for control transmissions. Aspects presented herein improve the efficient utilization of resources by enabling data transmission in unused resources of the UL control region 506, 512.

Similar to the DL centric slot, the UL centric slot may comprise a DL control region 508, e.g., for PDCCH transmissions. The DL control region 502, 508 may comprise a limited number of symbols at the beginning of a slot. The UL centric slot may comprise an UL data region 510, e.g., for the transmission of a Physical Uplink Shared Channel (PUSCH) that carries data, and may additionally be used to carry a buffer status report (BSR), a power headroom report (PHR), and/or UCI. The UL data region 510 may be referred to as a UL regular burst (ULRB) region.

The UL centric slot may comprise a guard band between the UL data region 510 and the ULCB 512. For example, the guard band may be based on the base station's capabilities and used to reduce interference when the UL data region 510 and the ULCB have different numerologies (symbol periods, slot lengths, etc.). The DL control region 502, 508 may comprise a limited number of symbols at the beginning of a slot and the ULCB region may comprise one or two symbols at the end of the slot, for both the DL centric and the UL centric slots. Resource management of PUSCH or PUCCH transmissions in the ULRB may be similar to that PUSCH or PUCCH for LTE. However, where LTE may be primarily driven by a SC-FDM waveform, 5G/NR may be based on an SC-FDM or OFDM waveform in the ULRB 510.

Figure 6:
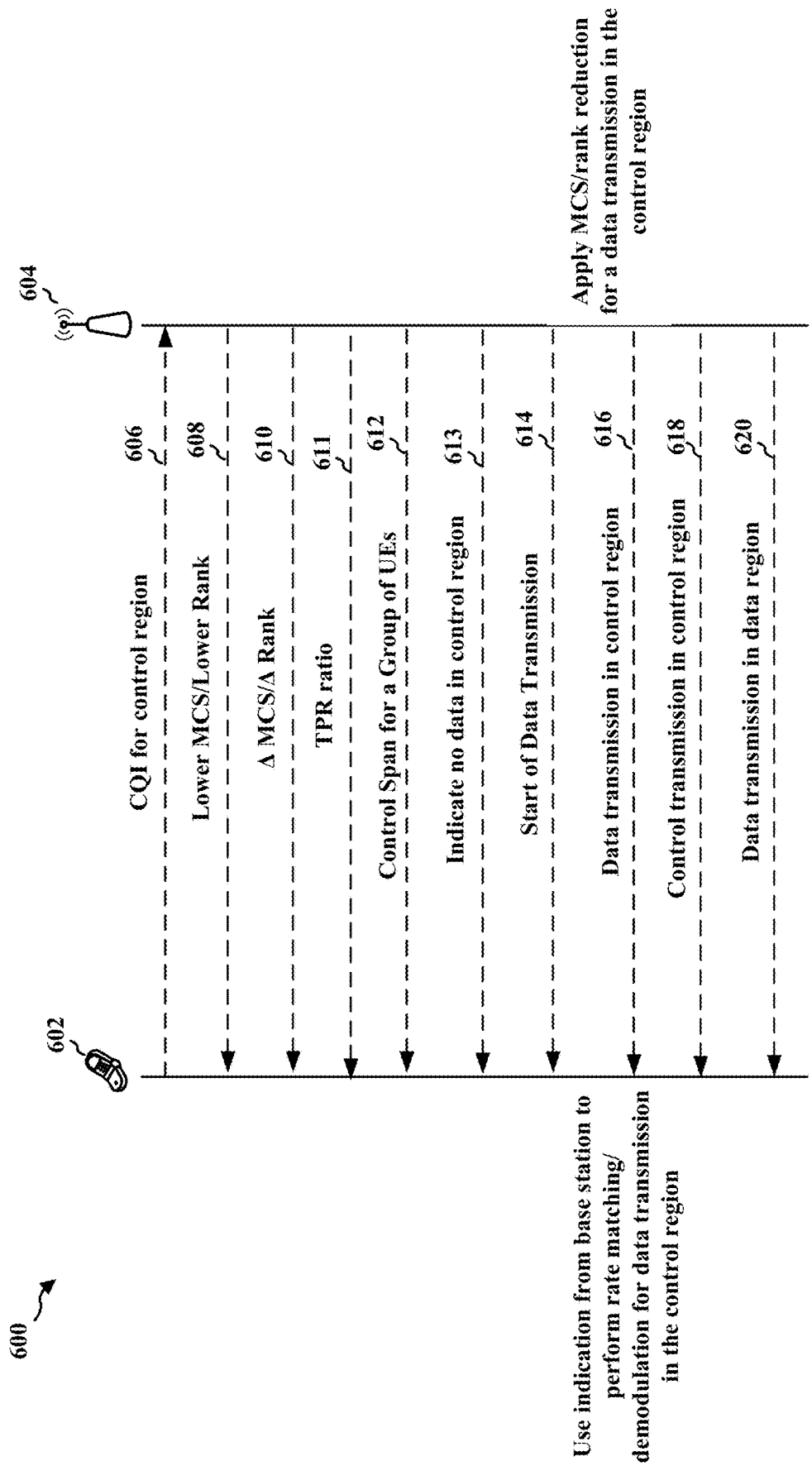
FIG. 6 is a diagram illustrating and example signal flow between a base station and a UE.

FIG. 6 illustrates an example diagram 600 of a call flow between a UE 602 and a base station 604, e.g., in 5G/NR. Resources for communication, e.g., a slot as described in connection with FIG. 5, may be separated into a control region and a data region. Therefore, the base station 604 may transmit a control transmission to UE 602 in the control region at 618 and may transmit a data transmission in a data transmission at 620. In 5G/NR the Control Region, e.g., spanning first few OFDM symbols, may be split into subbands called resource sets. The UE may monitor only a few resource sets instead of the entire BW. Thus, if only a few control resource sets are utilized for PDCCH transmission, the control region may have empty resource elements that could be instead used for a data transmission, e.g., PDSCH. Similarly, resource sets in an UL control portion of a slot may be unused for PUCCH, and may be used instead for PUSCH. In FIG. 6, base station 604 transmits a data transmission to UE 602 in a control region at 616. However, performance may be impacted when data such as PDSCH is transmitted in the control region. For example, using a same MCS for data transmitted in the control as for data transmitted in a data region may impact performance. Additionally, due to analog BF constraints, a UE might be forced to use a control beam to receive the data, which may lead to performance loss. Furthermore, an interference profile in the control region, e.g., the first few OFDM symbols, may be different from an interference profile in a data region. Therefore, there is a need to improve data transmission, e.g., PDSCH performance, when data is transmitted in a control region of a slot.

In order to avoid performance loss, a base station may adjust the data transmission in the control region in comparison to data that the base station transmits in a data region. For example, the base station may transmit PDSCH in a control region using a different MCS and/or a different rank than the base station uses for PDSCH transmitted in a data region. The adjusted MCS/rank may comprise a reduced MCS/rank in comparison to the MCS/rank for data transmitted in a data region, in one example. The PDSCH transmission may also be transmitted at a higher power in the control region than in the data region. Therefore, a TPR ratio may also be signaled to the UE, at 611, in order to assist the UE in receiving the PDSCH. However, the base station may also use a higher MCS, in another example. A different MCS may include a different modulation, e.g., 16QAM for a data transmission in a control region rather than the 64 QZM used for a data transmission in a data region. A different MCS may also include a different coding rate, e.g., a coding rate of ½ code for a data transmission in a control region rather than the ⅔ coding rate used for a data transmission in a data region. In another example, Codebooks for the control region may have a different coding rate compared to coding books for the data region. These adjustments are merely examples of the adjustments that may be made to the MCS/rank. The base station may signal to a UE the adjustment for the data transmission in the control region in order to assist the UE in performing rate matching or demodulation of the data transmission in the control region. The base station may also indicate to the UE that no data is transmitted in resources of the control region, e.g., at 613. Various information may be indicated to the UE 602, e.g., any of 608, 610, 612, 613, 614, etc. The base station may signal an indication/information to the UE via RRC, a MAC CE, dynamically via DCI, etc.

The UE can utilize this signaled information from the base station to perform rate matching for the data received in a control region based on the updated MCS/rank, in one example. In another example, the UE may utilize the signaled information to perform demodulation of the data transmission in the control region using the updated MCS/rank.

Although this example is described in connection with the transmission of PDSCH along with PDCCH in a control region, the aspects presented herein are also applicable to data transmissions within an uplink control region. For example, a UE may use an uplink control region to transmit PUSCH. The indications from the base station may provide information to the UE regarding the use of a different MCS/rank for the PUSCH transmission within the control region than for data transmitted in a data region. The adjustment to the MCS/rank for the PUSCH may assist the base station in receiving PUCCH and PUSCH in the uplink control region.

The UE can also report additional CQI in the control region to the base station, in addition to data region. The base station may use the additional CQI reported in the control region to determine an adjustment to the MCS/rank for the data transmission in the control region in comparison to data transmitted in the data region.

In 5G/NR a UE may receive a data transmission, e.g. PDSCH, on one reception beam and may receive a control transmission, e.g. PDCCH, on a different reception beam. Due to analog BF constraints, a UE might not be able to change reception beams within an OFDM symbol. In one example, if the data transmission is transmitted in the control region, the UE might choose to use the same reception beam that the UE uses to receive the control transmission to receive the data transmission. This might not be optimal if there is no MCS reduction for the data transmission in the control region, as there may be a beam mismatch. Therefore, the base station may use a lower MCS/rank for the data transmission in the control region compared to a data transmission in the data region. The base station may also signal the lower MCS/lower Rank, e.g., at 608, or an MCS/Rank delta, e.g., at 610, for the data transmission in the control region to enable UE to decode the data transmission in the control region. An MCS Delta, e.g., may indicate the difference between the MCS for a data transmission in a data region and the MCS of a data transmission in the control region. Similarly, a rank delta may indicate the difference between the rank for a data transmission in a data region and the rank of a data transmission in the control region. The benefit of signaling the MCS delta is that it may require a reduced number of bits compared to indicating an full MCS for the data transmission in the control region. The base station may similarly signal a TPR delta, e.g., at 611, which may indicate a difference between a first TPR for a data transmission in the data region and a second TPR for a data transmission in the control region.

The UE may report CQI for data reception in the control region. The CQI may involve a measurement using a data reception beam in the control region and/or a measurement using a control beam in the control region. While reporting CQI, the UE can also signal its MCS/Rank delta to aid the base station in determining an MCS/rank adjustment for the data transmission in the control region. Alternately, the reduction in MCS/rank may be preconfigured whenever data is transmitted in the control region. Thus, the UE may be aware of a reduced MCS/rank that is used whenever data is transmitted in the control region, or the UE may be aware of a delta for the MCS/rank that is used whenever data is transmitted in the control region. For example, a delta number n may be preconfigured so that an MCS for a data transmission in a control region is always n less than an MCS used to transmit a data transmission in the data region.

In another 5G/NR example, a UE may observe a different interference profile in the control region in comparison to the interference profile in the data region. This difference in the interference profile might not be optimal for performance if there is no MCS reduction for a data transmission in the control region. Therefore, similar to the example addressing a beam mismatch, the base station may use a lower MCS/rank for the data transmission in the control region compared to a data transmission in the data region. The base station may also signal the lower MCS/lower Rank or an MCS/Rank delta for the data transmission in the control region to enable UE to decode the data transmission in the control region.

The UE may report CQI for data reception in the control region to the base station, e.g., at 606, which may aid the base station in determining an MCS/rank adjustment for the data transmission in the control region. The CQI may involve a measurement using a data reception beam in the control region and/or a measurement using a control beam in the control region. While reporting CQI, the UE can also signal its MCS/Rank delta to aid the base station in determining an MCS/rank adjustment for the data transmission in the control region. Alternately, the reduction in MCS/rank may be preconfigured whenever data is transmitted in the control region. Thus, the UE may be aware of a reduced MCS/rank that is used whenever data is transmitted in the control region, or the UE may be aware of a delta for the MCS/rank that is used whenever data is transmitted in the control region. For example, a delta number n may be preconfigured so that an MCS for a data transmission in a control region is always n less than an MCS used to transmit a data transmission in the data region.

Control regions may differ for different UEs served by the base station. For example, a first UE may have a first OFDM symbol as a control region, whereas a second UE may have both a first OFDM symbol and a second OFDM symbol for its control region. The MCS for a data transmission to the first UE may be reduced in the second OFDM symbol, even though it is not the control region for the first UE, because it is the control region for the second UE. Therefore, a control region may span all symbols that are configured as a control region for any one of a group of UEs. A span of a control region may be referred to herein as a control span. The base station may indicate a control span for a group of UEs to a first UE, e.g., at 612. The base station may also provide information regarding an MCS/rank adjustment for data transmissions within the control span. Then, the first UE may use the information to receive data transmissions within the control span, even when the data transmission is within a data region for the UE.

Figure 7:
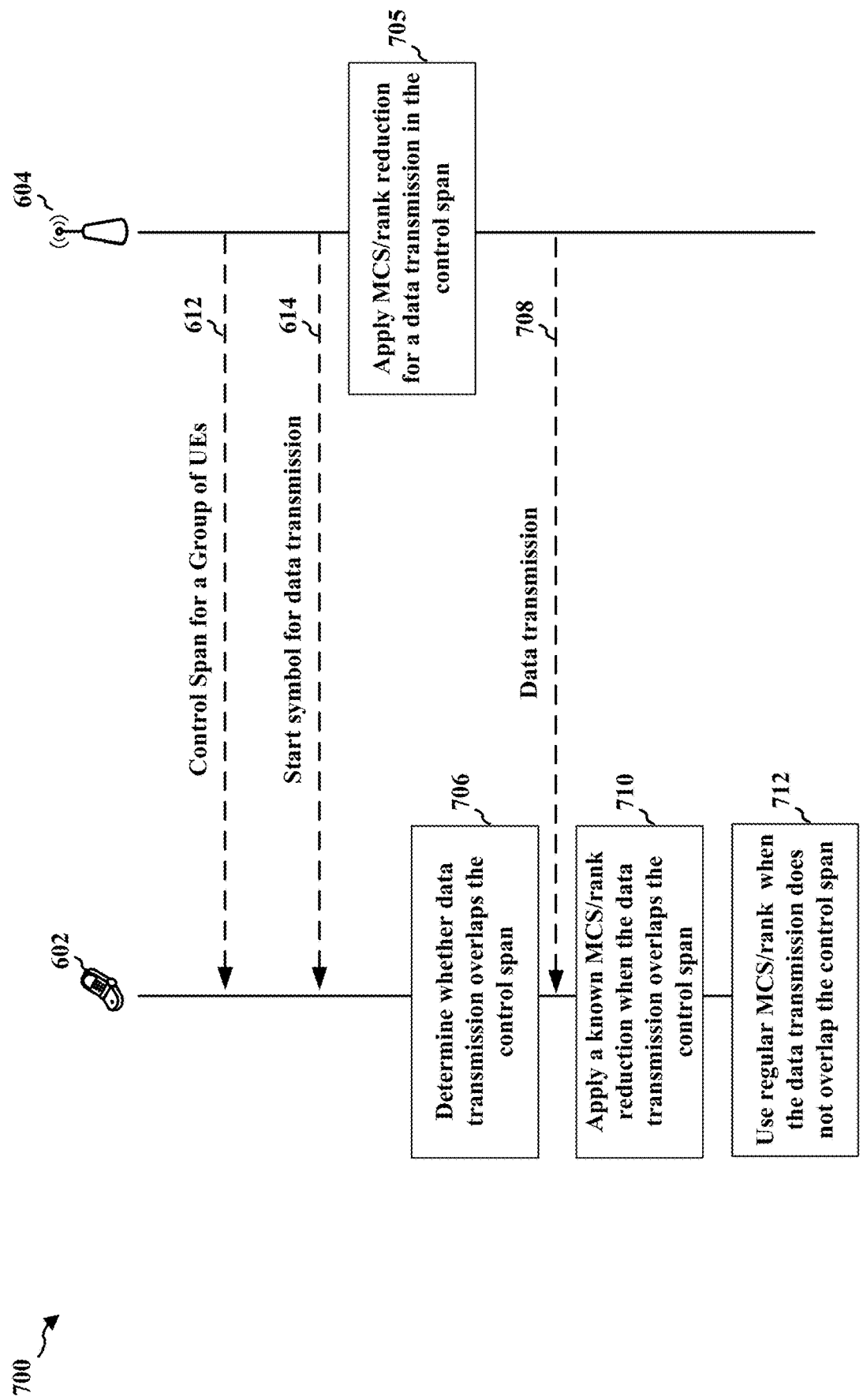
FIG. 7 is a diagram illustrating and example signal flow between a base station and a UE.

In another example, the UE may be aware of an adjusted MCS/rank for data transmissions within a control region/control span. FIG. 7 illustrates an example signal flow diagram 700 between UE 602 and base station 604. The UE may use the indication regarding the control span at 612 to determine when to apply an adjusted MCS/rank for a data transmission. For example, the MCS/rank reduction may comprise a predefined parameter. The UE may determine at 706, whether the data transmission overlaps the control span. The UE may receive the data transmission at 708. When the UE determines that the data transmission overlaps the control span, the UE may apply the known MCS/rank reduction to receive the data transmission at 710. When the UE determines that the data transmission does not overlap the control span, the UE may use the regular MCS/rank to receive the data transmission at 712.

In another example, signaling may be used to enable different MCS operations including a special case where no data is transmitted in the control region. Thus, the base station may indicate to the UE that resources in the control region do not include data. In the example where the UE may is aware of an adjusted MCS/rank for data transmissions within a control region/control span, the base station may indicate to the UE when there will not be any data transmissions within a control region.

In another example, the UE may determine a starting symbol of a data transmission to determine whether the starting symbol is within a control region/control span. The determination may be based on signaling of a starting symbol from the base station, e.g., at 614. For example, the base station may signal a starting symbol for a data transmission to the UE via DCI signaling. When the UE determines that the starting symbol is within the control region/control span, the UE may apply a reduced MCS/rank to receive the data transmission. The reduced MCS/rank may be preconfigured or otherwise known by the UE or may be indicated to the UE by the base station.

Figure 8:
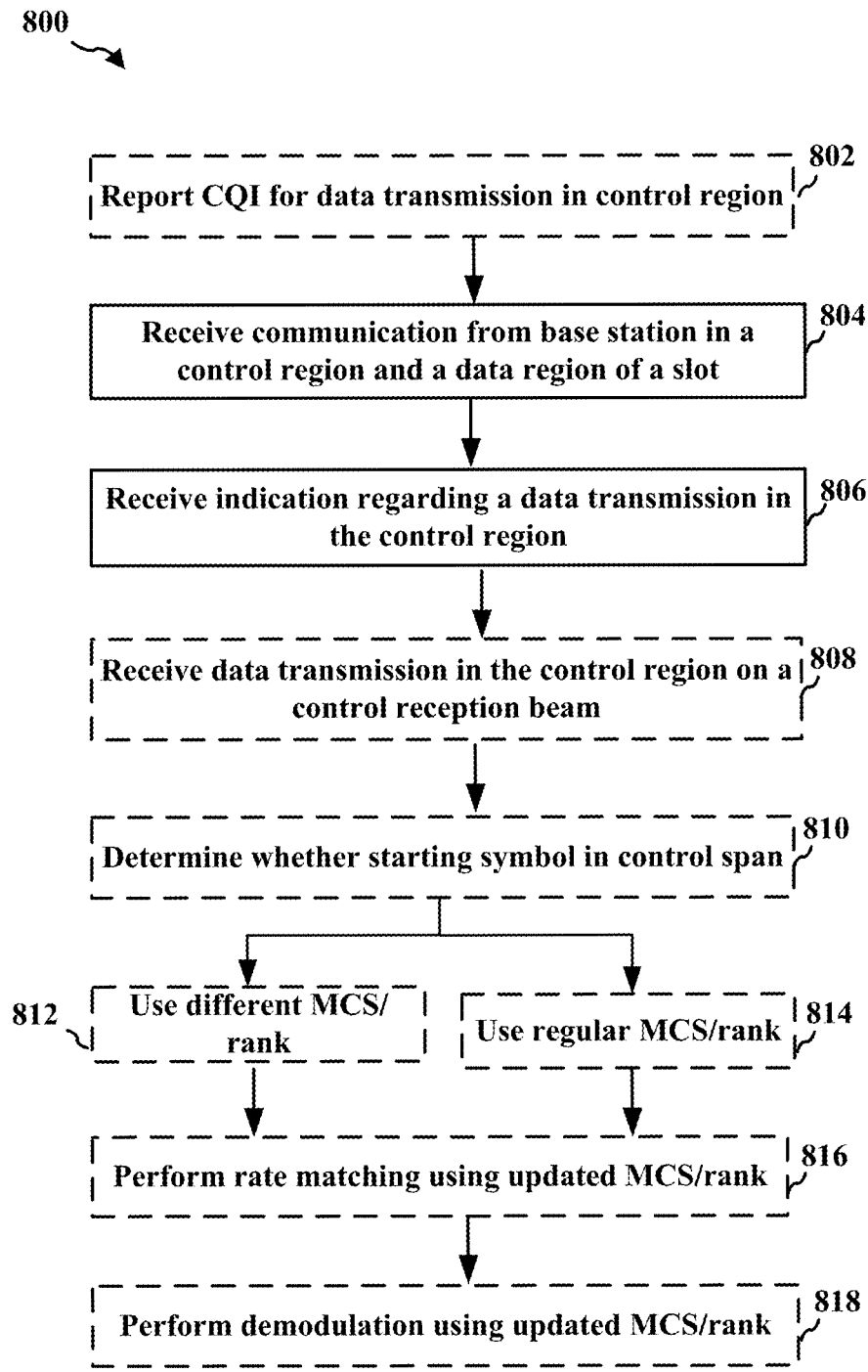
FIG. 8 is a flowchart of a method of wireless communication.

FIG. 8 is a flowchart 800 of a method of wireless communication. The method may be performed by a UE (e.g., the UE 104, 350, 404, 602, 1250 the apparatus 902/902') communicating wirelessly with a base station (e.g., the base station 102, 180, 402, 604, 950, the apparatus 1202, 1202'). At 804, the UE receives communication from a base station in a control region and a data region, e.g., a control region and a data region of a slot. The UE may also transmit communication to the base station in the control region and the data region. At 806, the UE receives an indication from the base station regarding a data transmission in the control region. The data transmission in the control region overlaps a control transmission in time, and the indication indicates a different MCS and/or a different rank for the data transmission in the control region than for a data transmission in the data region. The indication may relate to a data transmission from the base station, e.g., PDSCH, or may relate to a data transmission from the UE, e.g., PUSCH. The indication may comprise a different MCS or a different rank for the data transmission in the control region, as described in connection with 608 in FIG. 6. For example, the indication may comprise a reduced MCS/ reduced rank than the MCS/rank for a data transmission in the data region. The indication may comprise an MCS difference, e.g., an MCS delta, for the data transmission in the control region in comparison to a second MCS for a second data transmission in the data region, as described in connection with 610 in FIG. 6. The indication may comprise a rank difference, e.g., a rank delta, for the data transmission in the control region in comparison to a second rank for a second data transmission in the data region, as described in connection with 610 in FIG. 6. The indication may indicate that there is no data transmission in the control region. Thus, the base station may indicate, e.g., in a downlink control message, that resources in the control region do not include PDSCH The indication may comprise a control span for a group of multiple UEs, wherein the control span comprises resources configured as the control region for any of the multiple UEs in the group, as described in connection with 612 in FIG. 6. The UE may then use a reduced MCS parameter or a reduced rank parameter for the control span. The indication may be received as at least one of RRC signaling, a MAC control element, or DCI.

At 802, the UE may report a CQI for receiving data in the control region. The base station may use the CQI report to determine an adjusted MCS/rank for the data transmission in the control region.

At 816, the UE may perform rate matching for the data transmission in the control region using an updated MCS/ updated rank based on the indication.

At 818, the UE may perform demodulation of the data transmission in the control region using an updated MCS/ updated rank based on the indication.

The UE may receive a control transmission on a first reception beam and receives a second data transmission in the data region on a second reception beam. In this example, at 808, the UE may receive the data transmission in the control region on the first reception beam.

The indication may comprise a starting symbol for the data transmission, e.g., as described in connection with 614 in FIG. 6. In this example, the UE may determine whether the starting symbol is within the control region at 810. The UE may then use a reduced MCS or a reduced rank to receive the data transmission at 812, when the starting symbol is within the control region and may use a second MCS for data transmission in the data region at 814, when the starting symbol is within the data region.

Figure 9:
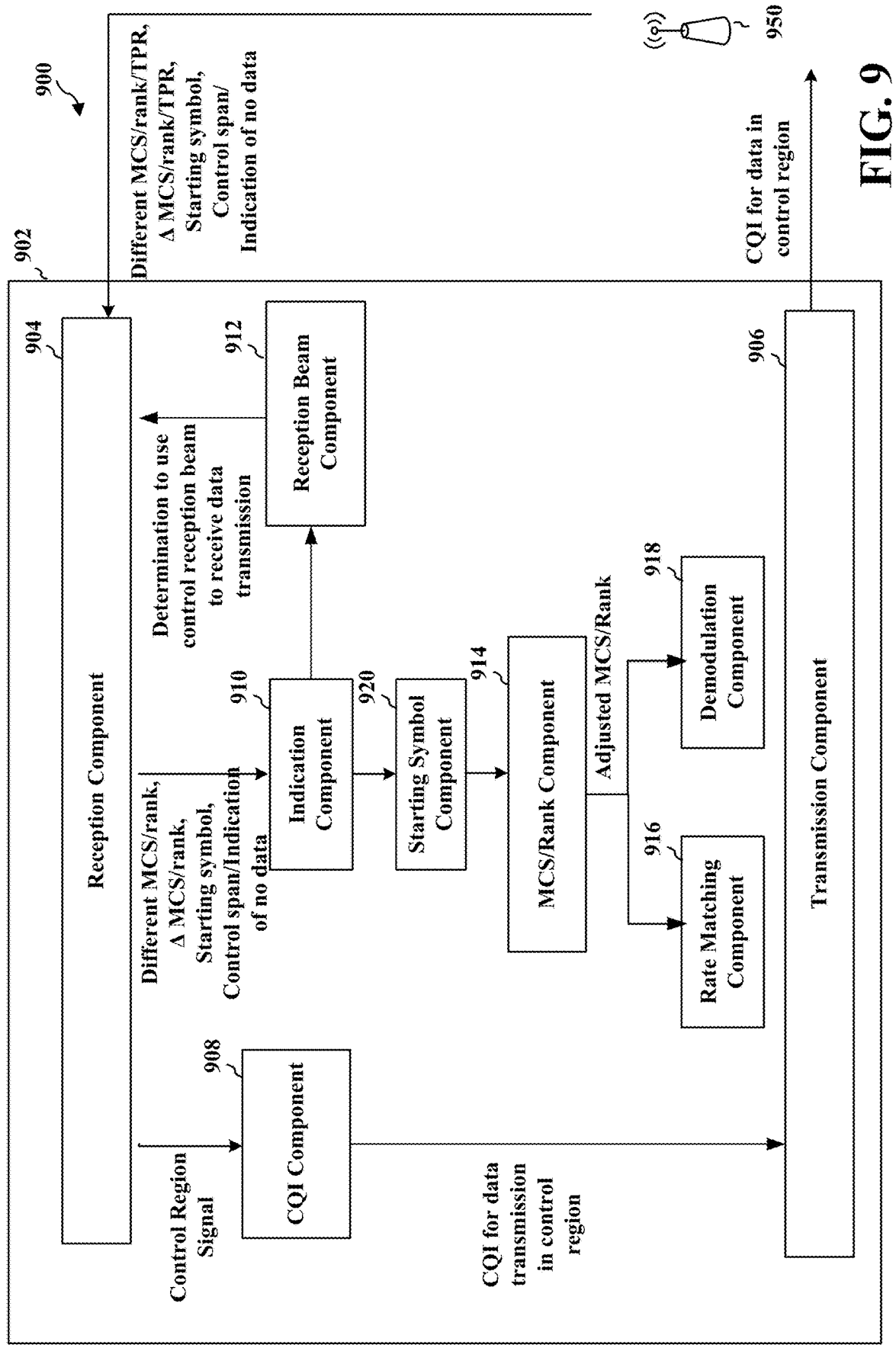
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE (e.g., the UE 104, 350, 404, 602, 1250) communicating wirelessly with a base station 950 (e.g., the base station 102, 180, 402, 604, the apparatus 1202, 1202'). The apparatus includes a reception component 904 that receives DL communication from base station 950, including communication in a control region and a data region of a slot, and a transmission component 906 that transmits UL communication to the base station 950.

The apparatus may include an indication component 910 that receives an indication from the base station 950 regarding a data transmission in the control region, as described in connection with 806 in FIG. 8. The indication may comprise a reduced MCS or a reduced rank for the data transmission in the control region, as described in connection with 608 in FIG. 6. The indication may comprise an MCS delta for the data transmission in the control region in comparison to a second MCS for a second data transmission in the data region, as described in connection with 610 in FIG. 6. The indication may comprise a rank delta for the data transmission in the control region in comparison to a second rank for a second data transmission in the data region, as described in connection with 610 in FIG. 6. The indication may indicate that there is no data transmission in the control region. The indication may comprise a control span for a group of multiple UEs, wherein the control span comprises resources configured as the control region for any of the multiple UEs in the group, as described in connection with 612 in FIG. 6. The UE may then use a reduced MCS parameter or a reduced rank parameter for the control span. The indication may be received as at least one of RRC signaling, a MAC control element, or DCI.

The apparatus may comprise a CQI component 908 configured to report a channel quality indication for receiving data in the control region to the base station 950.

The apparatus may comprise a reception beam component 912 configured to determine a reception beam to be used for receiving a data transmission, e.g., a data transmission in a control region. The determination may be based on information from the indication component 910. For example, the UE may receive a control transmission on a first reception beam (e.g., a control reception beam) and may receive a second data transmission in the data region on a second reception beam. While data transmissions may typically be received using a different, data reception beam, the beam reception component may determine to receive the data transmission in the control region on the first reception beam (e.g., the control reception beam).

The apparatus may include an MCS/rank component 914 configured to determine an MCS or rank for receiving a data transmission. The determination may be based on whether the data transmission is received in a control region, which may include determining a control span and determining whether the data transmission starts within the control span. The determination may be further based on information received from the base station in the indication, including, a lower MCS, a lower rank, an MCS Δ, a rank Δ, etc.

The apparatus may include a rate matching component 916 configured to performing rate matching for the data transmission in the control region, e.g., using an updated MC S/rank based on the indication. The apparatus may include a demodulation component 918 configured to perform demodulation of the data transmission in the control region using an updated MCS/rank based on the indication.

In one example, the indication received indicates a starting symbol for the data transmission. Thus, the apparatus may include a starting symbol component 920 configured to determine whether the starting symbol is within the control region. The rate matching component 916 and/or the demodulation component 918 may be configured to use a reduced MCS/rank to receive the data transmission, when the starting symbol is within the control region and/or to use a second MCS for data transmission in the data region, when the starting symbol is within the data region.

The apparatus may include additional components that perform each of the blocks of the algorithm in the aforementioned flowcharts of FIG. 6, 7, or 8. As such, each block in the aforementioned flowcharts of FIG. 6, 7, or 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
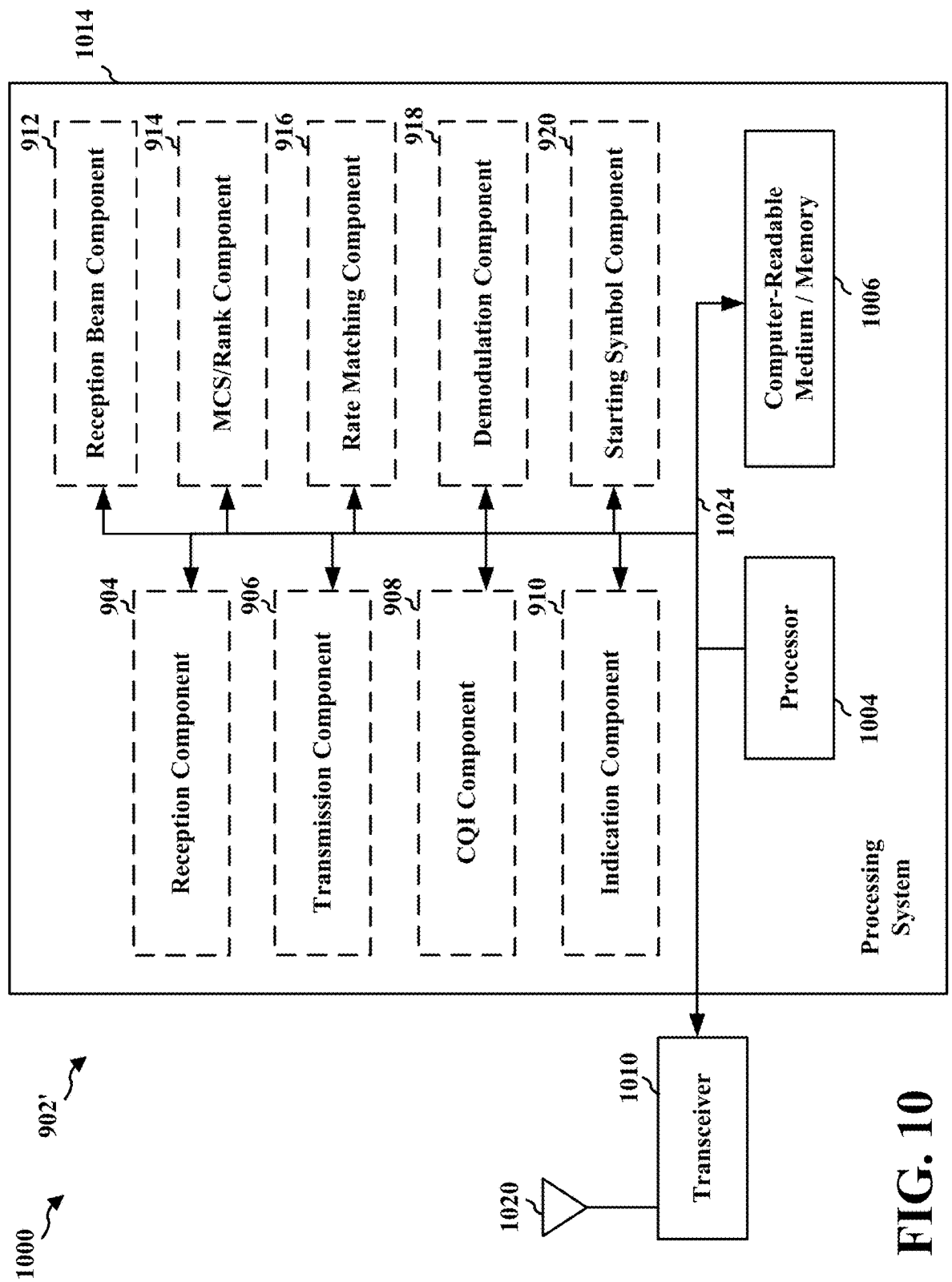
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, 920, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916, 918, 920. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for receiving communication from a base station in a control region and a data region of a slot (e.g., 904), means for receiving an indication from the base station regarding a data transmission in the control region (e.g., 910), means for reporting a CQI for receiving data in the control region (e.g., 908), means for performing rate matching (e.g., 916), means for performing demodulation of the data transmission (e.g., 918), means for receiving the data transmission in the control region on a control reception beam (904, 912), and means for determining whether a starting symbol is within a control region (e.g., 920). The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
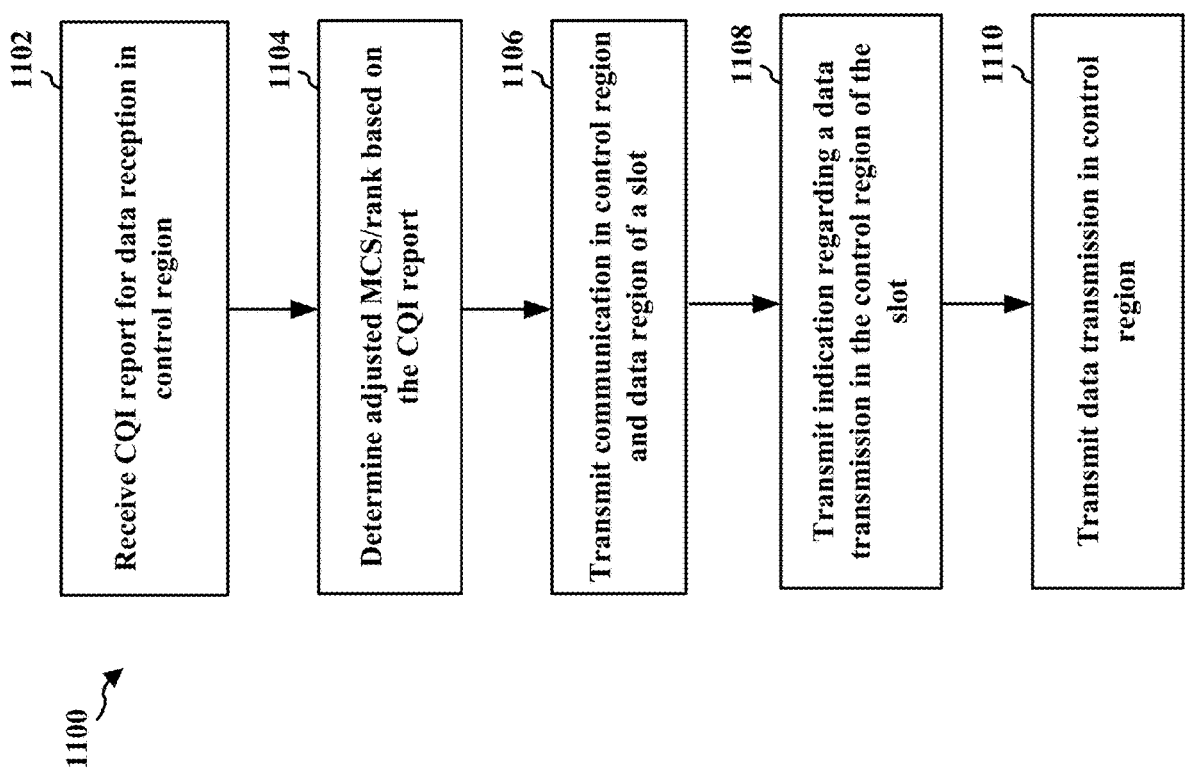
FIG. 11 is a flowchart of a method of wireless communication.

FIG. 11 is a flowchart 1100 of a method of wireless communication. The method may be performed by a base station (e.g., the base station 102, 180, 402, 604, 950, the apparatus 1202, 1202') communicating wirelessly with a UE (e.g., the UE 104, 350, 404, 602, 1250 the apparatus 902/902'). At 1106, the base station transmits communication to the UE in a control region and a data region, e.g., of a slot.

At 1108, the base station transmits an indication to the UE regarding a data transmission in the control region. The data transmission in the control region overlaps a control transmission in time, and the indication indicates a different MCS and/or a different rank for the data transmission in the control region than for a data transmission in the data region. The indication may relate to a data transmission from the base station, e.g., PDSCH, or may relate to a data transmission from the UE, e.g., PUSCH. The indication may indicate a different MCS or a different rank for the data transmission in the control region. For example, the different MCS/rank may be a reduced MCS/rank. The indication may indicate an MCS difference, e.g., an MCS delta, for the MCS for the data transmission in the control region in comparison to a second MCS for a second data transmission in the data region, as described in connection with 608 in FIG. 6. The indication may indicate a rank difference, e.g., a rank delta, for the data transmission in the control region in comparison to a second rank for a second data transmission in the data region, as described in connection with 610 in FIG. 6. The indication may indicate that there is no data transmission in the control region. The indication may indicate a control span for a group of multiple UEs, wherein the control span comprises resources configured as the control region for any of the multiple UEs in the group, e.g., as described in connection with 612 in FIG. 6. The indication may indicate a starting symbol for the data transmission, e.g., as described in connection with 614 in FIG. 6. The indication may be transmitted as at least one of RRC signaling, a MAC control element, or DCI. The indication may provide information to the UE for at least one of rate matching for the data transmission in the control region using an updated MCS and demodulation of the data transmission in the control region using the updated MCS.

The base station may optionally receive a channel quality indication for receiving data in the control region from the UE at 1102, and may determine a reduced MCS or a reduced rank for the data transmission in the control region at 1104 based on the received channel quality indicator.

While the transmission at 1106 may occur after the indication is transmitted at 1108, at 1110, the base station may transmit a data transmission to the UE in the control region of the slot according to the indication at 1108.

Figure 12:
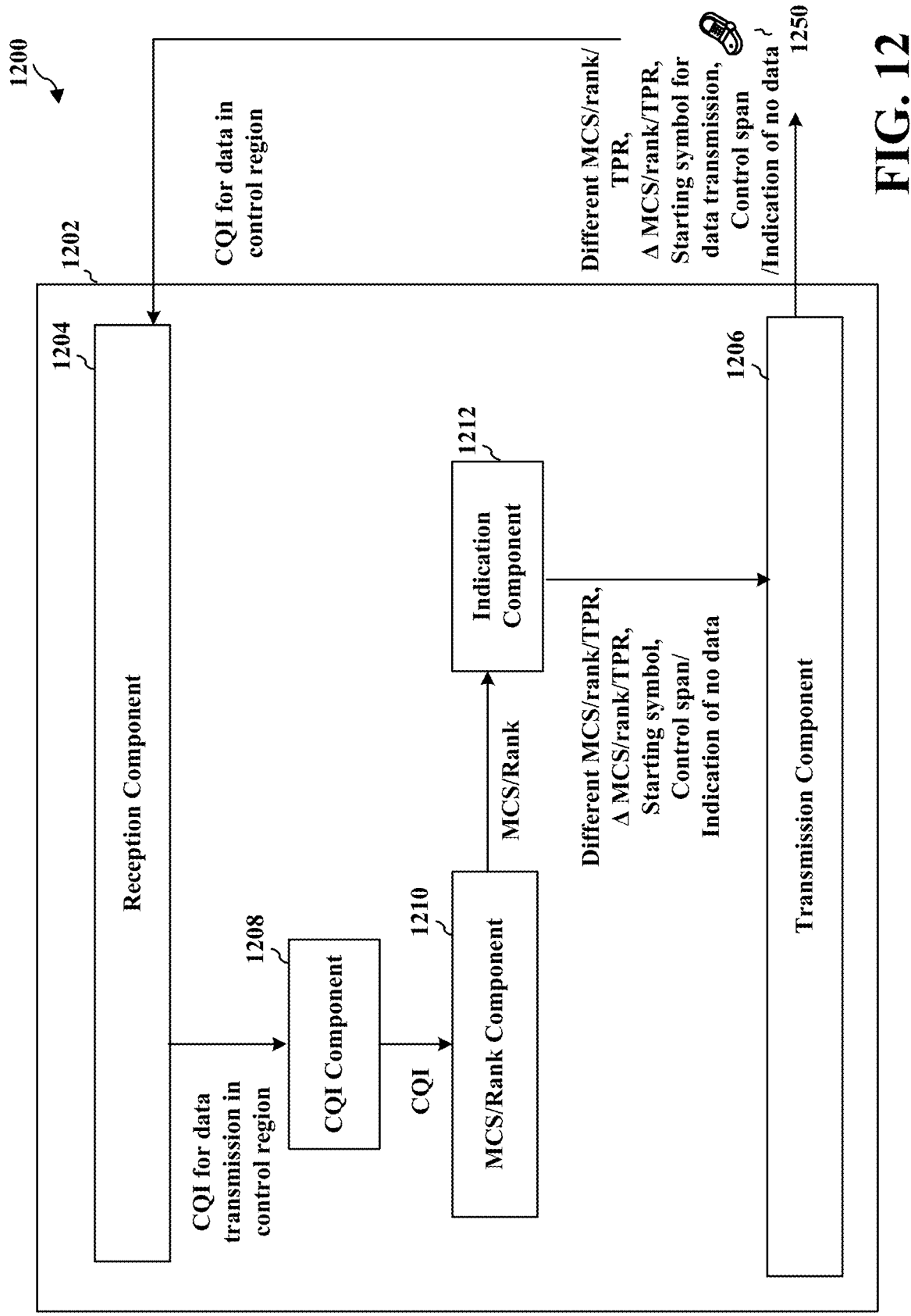
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a base station (e.g., the base station 102, 180, 402, 604, 950) communicating wirelessly with a UE 1250 (e.g., the UE 104, 350, 404, 602, the apparatus 902/902'). The apparatus includes a reception component 1204 that receive UL communication from the UE 1250, and a transmission component 1206 that transmits DL communication to the UE 1250, including communication in a control region and a data region of a slot. The apparatus may include an indication component 1212 configured to transmit an indication to the UE regarding a data transmission in the control region. The indication may comprise any of the information described in connection with 1108 of FIG. 11. The apparatus may include a CQI component 1208 configured to receive receiving a channel quality indication for receiving data in the control region from the UE. The apparatus may include an MCS/rank component 1210 configured to determine a reduced MCS or a reduced rank for a data transmission in the control region of the slot. The determination may be based on the received channel quality indicator.

The transmission component 1206 may be configured to transmit a data transmission to the UE 1250 in a control region of a slot using a reduced MCS or a reduced rank, e.g., as determined in connection with any of 1208, 1210, 1212.

The apparatus may include additional components that perform each of the blocks of the algorithm in the aforementioned flowcharts of FIG. 6, 7, or 11. As such, each block in the aforementioned flowcharts of FIG. 6, 7, or 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
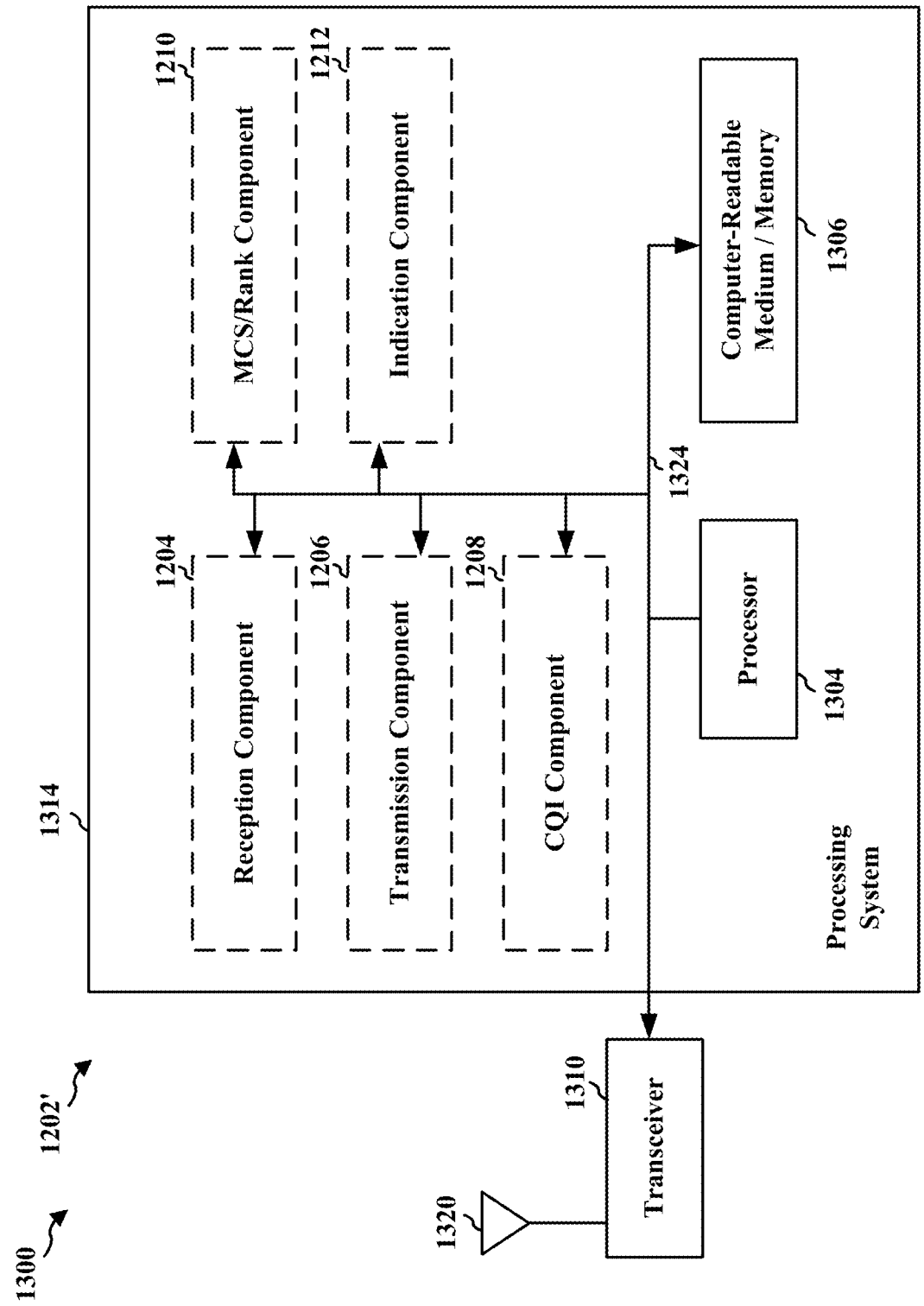
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for transmitting communication to a UE in a control region and a data region of a slot (e.g., 1206), means for transmitting an indication to the UE regarding a data transmission in the control region (e.g., 1212), means for transmitting a data transmission in the control region of the slot (e.g., 1206), e.g., using a reduced MCS or a reduced rank, means for receiving a channel quality indication for receiving data in the control region from the UE (e.g., 1208), and means for determining a reduced modulation and coding scheme (MCS) or a reduced rank for the data transmission in the control region based on the received channel quality indicator (e.g., 1210). The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a control transmission from a base station in a control region of a slot, wherein the UE receives the control transmission using a first reception beam; and
   receiving a data transmission from the base station using a reception beam based on whether the data transmission is received in the control region of the slot or a data region of the slot, wherein the UE receives the data transmission using the first reception beam when the data transmission is in the control region of the slot and using a second reception beam when the data transmission is in the data region of the slot.

2. The method of claim 1, further comprising:
   using a reduced modulation and coding scheme (MCS) or a reduced rank to receive the data transmission when the data transmission is in the control region.

3. The method of claim 2, further comprising:
   receiving an indication from the base station that indicates the reduced MCS or the reduced rank to receive the data transmission that is in the control region.

4. The method of claim 3, wherein the indication indicates an MCS difference for a first MCS for the data transmission in the control region in comparison to a second MCS for a second data transmission in the data region.

5. The method of claim 3, wherein the indication indicates a Traffic-to-pilot Ratio (TPR) difference for a first TPR for the data transmission in the control region and a second TPR for a second data transmission in the data region.

6. The method of claim 3, wherein the indication indicates a rank difference for the data transmission in the control region in comparison to a second rank for a second data transmission in the data region.

7. The method of claim 3, further comprising:
   performing rate matching for the data transmission in the control region using an updated MCS or rank based on the indication.

8. The method of claim 3, further comprising:
   performing demodulation of the data transmission in the control region using an updated MCS or rank based on the indication.

9. The method of claim 3, wherein the indication is received as at least one of Radio Resource Control (RRC) signaling, a Medium Access Control (MAC) control element, or downlink control information (DCI).

10. The method of claim 3, wherein the indication indicates a control span for a group of multiple UEs, wherein the control span comprises resources configured as the control region for any of the multiple UEs in the group of multiple UEs.

11. The method of claim 10, wherein the UE uses a reduced modulation and coding scheme (MCS) parameter or a reduced rank parameter for the control span.

12. The method of claim 3, wherein the indication indicates a starting symbol for the data transmission, the method further comprising:
   determining whether the starting symbol is within the control region;
   using the reduced MCS or the reduced rank to receive the data transmission, when the starting symbol is within the control region; and
   using a second MCS or a second rank to receive a second data transmission, when the starting symbol is within the data region.

13. An apparatus for wireless communication at a user equipment (UE), comprising:
   a memory; and
   at least one processor coupled to the memory, the memory and the at least one processor configured to:
      receive a control transmission from a base station in a control region of a slot, wherein the UE receives the control transmission using a first reception beam; and
      receive a data transmission from the base station using a reception beam based on whether the data transmission is received in the control region of the slot or a data region of the slot, wherein the memory and the at least one processor are configured to receive the data transmission using the first reception beam when the data transmission is in the control region of the slot and using a second reception beam when the data transmission is in the data region of the slot.

14. The apparatus of claim 13, wherein the memory and the at least one processor are further configured to use a reduced modulation and coding scheme (MCS) or a reduced rank to receive the data transmission when the data transmission is in the control region.

15. The apparatus of claim 14, wherein the memory and the at least one processor are further configured to:
   receive an indication from the base station that indicates the reduced MCS or the reduced rank to receive the data transmission in the control region.

16. The apparatus of claim 15, wherein the indication indicates an MCS difference for a first MCS for the data transmission in the control region in comparison to a second MCS for a second data transmission in the data region.

17. The apparatus of claim 15, wherein the indication indicates a Traffic-to-pilot Ratio (TPR) difference for a first TPR for the data transmission in the control region and a second TPR for a second data transmission in the data region.

18. The apparatus of claim 15, wherein the indication indicates a rank difference for the data transmission in the control region in comparison to a second rank for a second data transmission in the data region.

19. The apparatus of claim 15, wherein the memory and the at least one processor are further configured to:
perform rate matching for the data transmission in the control region using an updated MCS or rank based on the indication.

20. The apparatus of claim 15, wherein the memory and the at least one processor are further configured to:
perform demodulation of the data transmission in the control region using an updated MCS or rank based on the indication.

21. The apparatus of claim 15, wherein the indication is received as at least one of Radio Resource Control (RRC) signaling, a Medium Access Control (MAC) control element, or downlink control information (DCI).

22. The apparatus of claim 15, wherein the indication indicates a control span for a group of multiple UEs, wherein the control span comprises resources configured as the control region for any of the multiple UEs in the group of multiple UEs.

23. The apparatus of claim 22, wherein the memory and the at least one processor are further configured to use a reduced modulation and coding scheme (MCS) parameter or a reduced rank parameter for the control span.

24. The apparatus of claim 15, wherein the indication indicates a starting symbol for the data transmission, and wherein the memory and the at least one processor are further configured to:
determine whether the starting symbol is within the control region;
use the reduced MCS or the reduced rank to receive the data transmission, when the starting symbol is within the control region; and
use a second MCS or a second rank to receive a second data transmission, when the starting symbol is within the data region.

25. The method of claim 1, further comprising:
choosing to receive the data transmission from the base station using the first reception beam based on the data transmission being in the control region of the slot.

26. The method of claim 25, further comprising:
determining that the data transmission from the base station has at least one symbol that overlaps with the control region of the slot.

27. The apparatus of claim 13, wherein the memory and the at least one processor are further configured to:
choose to receive the data transmission from the base station using the first reception beam based on the data transmission being in the control region of the slot.

28. The apparatus of claim 27, wherein the memory and the at least one processor are further configured to:
determine that the data transmission from the base station has at least one symbol that overlaps with the control region of the slot.

29. An apparatus for wireless communication at a user equipment (UE), comprising:
means for receiving a control transmission from a base station in a control region of a slot, wherein the UE receives the control transmission using a first reception beam; and
means for receiving a data transmission from the base station using a reception beam based on whether the data transmission is received in the control region of the slot or a data region of the slot, wherein the UE receives the data transmission using the first reception beam when the data transmission is in the control region of the slot and using a second reception beam when the data transmission is in the data region of the slot.

30. The apparatus of claim 29, further comprising:
means for choosing to receive the data transmission from the base station using the first reception beam based on the data transmission being in the control region of the slot.

31. The apparatus of claim 30, further comprising:
means for determining that the data transmission from the base station has at least one symbol that overlaps with the control region of the slot.

32. A non-transitory computer-readable storage medium storing computer executable code for wireless communication at a user equipment (UE), the code when executed by a processor cause the processor to:
receive a control transmission from a base station in a control region of a slot, wherein the UE receives the control transmission using a first reception beam; and
receive a data transmission from the base station using a reception beam based on whether the data transmission is received in the control region of the slot or a data region of the slot, wherein the UE receives the data transmission using the first reception beam when the data transmission is in the control region of the slot and using a second reception beam when the data transmission is in the data region of the slot.

33. The computer-readable storage medium of claim 32, further comprising code that when executed by the processor cause the processor to:
choose to receive the data transmission from the base station using the first reception beam based on the data transmission being in the control region of the slot.

34. The computer-readable storage medium of claim 33, further comprising code that when executed by the processor cause the processor to:
determine that the data transmission from the base station has at least one symbol that overlaps with the control region of the slot.

* * * * *